United States Patent
Hassan

(10) Patent No.: US 10,638,397 B2
(45) Date of Patent: Apr. 28, 2020

(54) HANDOVER IN 5G MICROCELLULAR

(71) Applicant: Microsoft Technology Licensing, LLC, Redmond, WA (US)

(72) Inventor: Amer Hassan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/389,355

(22) Filed: Dec. 22, 2016

(65) Prior Publication Data
US 2018/0184350 A1      Jun. 28, 2018

(51) Int. Cl.
*H04W 36/00*      (2009.01)
*H04W 52/38*      (2009.01)
(Continued)

(52) U.S. Cl.
CPC ............ *H04W 36/38* (2013.01); *H04H 60/45* (2013.01); *H04L 67/303* (2013.01); *H04L 69/28* (2013.01);
(Continued)

(58) Field of Classification Search
CPC .............. H04W 36/38; H04W 72/0473; H04W 72/0486; H04W 72/08; H04W 36/0055;
(Continued)

(56) References Cited

U.S. PATENT DOCUMENTS

| 6,507,740 B2 | 1/2003 | Shi |
| 6,628,949 B1 | 9/2003 | Park |

(Continued)

FOREIGN PATENT DOCUMENTS

| CN | 203205945 U | 9/2013 | |
| EP | 2482588 A1 * | 8/2012 | ............ H04W 36/22 |

(Continued)

OTHER PUBLICATIONS

Wang, et al., "Handoff Algorithms in Dynamic Spreading WCDMA System Supporting Multimedia Traffic", In IEEE Journal on Selected Areas in Communications, vol. 21, No. 10, Dec. 2003, 1652-1662 pages.

(Continued)

*Primary Examiner* — Gary Lafontant
(74) *Attorney, Agent, or Firm* — NovoTechIP International PLLC

(57) ABSTRACT

A first micro-base station may be configured initiate communications with a plurality of mobile devices, where each mobile device is associated with an access ID stored in the first micro-base station. The access ID may be a MAC ID. The first micro-base station may determine that a handover trigger has occurred. The first micro-base station may handover communications with at least one of the mobile devices to a second micro-base station by sending a list of access IDs to the second micro-base station. The access IDs sent by the first micro-base station may be a subset of the access IDs of mobile devices communicating with the first micro-base station. The second micro-base station receiving the list may then takeover communications with the at least one mobile device using the access IDs in the list. The handover may be transparent to the mobile devices that are handed over.

22 Claims, 7 Drawing Sheets

(51) Int. Cl.
*H04W 36/38* (2009.01)
*H04W 36/32* (2009.01)
*H04H 60/45* (2008.01)
*H04L 29/08* (2006.01)
*H04L 29/06* (2006.01)
*H04W 72/04* (2009.01)
*H04W 72/08* (2009.01)

(52) U.S. Cl.
CPC ........ *H04W 36/32* (2013.01); *H04W 72/0473* (2013.01); *H04W 72/0486* (2013.01); *H04W 72/08* (2013.01)

(58) Field of Classification Search
CPC ............... H04W 4/22; H04W 36/0016; H04W 36/0072; H04W 76/02; H04W 76/048; H04W 36/0005; H04H 60/45; H04L 67/303; H04L 69/28
See application file for complete search history.

(56) References Cited

U.S. PATENT DOCUMENTS

| | | | |
|---|---|---|---|
| 8,059,603 B2 | 11/2011 | Jin | |
| 8,243,656 B1* | 8/2012 | Bhan | H04W 76/11 370/328 |
| 8,438,309 B2 | 5/2013 | Vu et al. | |
| 8,868,071 B2 | 10/2014 | Ha et al. | |
| 9,137,719 B2 | 9/2015 | Harris et al. | |
| 9,179,372 B2 | 11/2015 | Cai et al. | |
| 9,191,459 B2 | 11/2015 | Ravindran et al. | |
| 9,913,181 B1* | 3/2018 | Oroskar | H04W 36/0083 |
| 2007/0026887 A1* | 2/2007 | Voyer | H04W 36/0055 455/525 |
| 2007/0258416 A1* | 11/2007 | Yegani | H04L 29/12254 370/338 |
| 2010/0265913 A1 | 10/2010 | Gorokhov et al. | |
| 2011/0263271 A1* | 10/2011 | Hoymann | H04B 7/024 455/456.1 |
| 2012/0002537 A1 | 1/2012 | Bao et al. | |
| 2013/0308473 A1* | 11/2013 | Sun | H04W 36/30 370/252 |
| 2015/0223119 A1* | 8/2015 | Xu | H04W 36/0066 455/436 |
| 2015/0245255 A1 | 8/2015 | Van Phan et al. | |
| 2015/0304933 A1 | 10/2015 | Sachs et al. | |
| 2016/0029282 A1 | 1/2016 | Lee et al. | |
| 2018/0035344 A1* | 2/2018 | Wang | H04W 36/08 |

FOREIGN PATENT DOCUMENTS

WO 2003003614 A1 1/2003
WO 2016163786 A1 10/2016

OTHER PUBLICATIONS

"Network controlled Mobility for NR", Retrieved From <<http://www.3gpp.org/ftp/Meetings_3GPP_SYNC/RAN2/Docs/>>, May 23, 2016, 2 Pages.
"International Search Report and Written Opinion Issued in PCT Application No. PCT/US2017/066231", dated Mar. 1, 2018, 17 Pages.

* cited by examiner

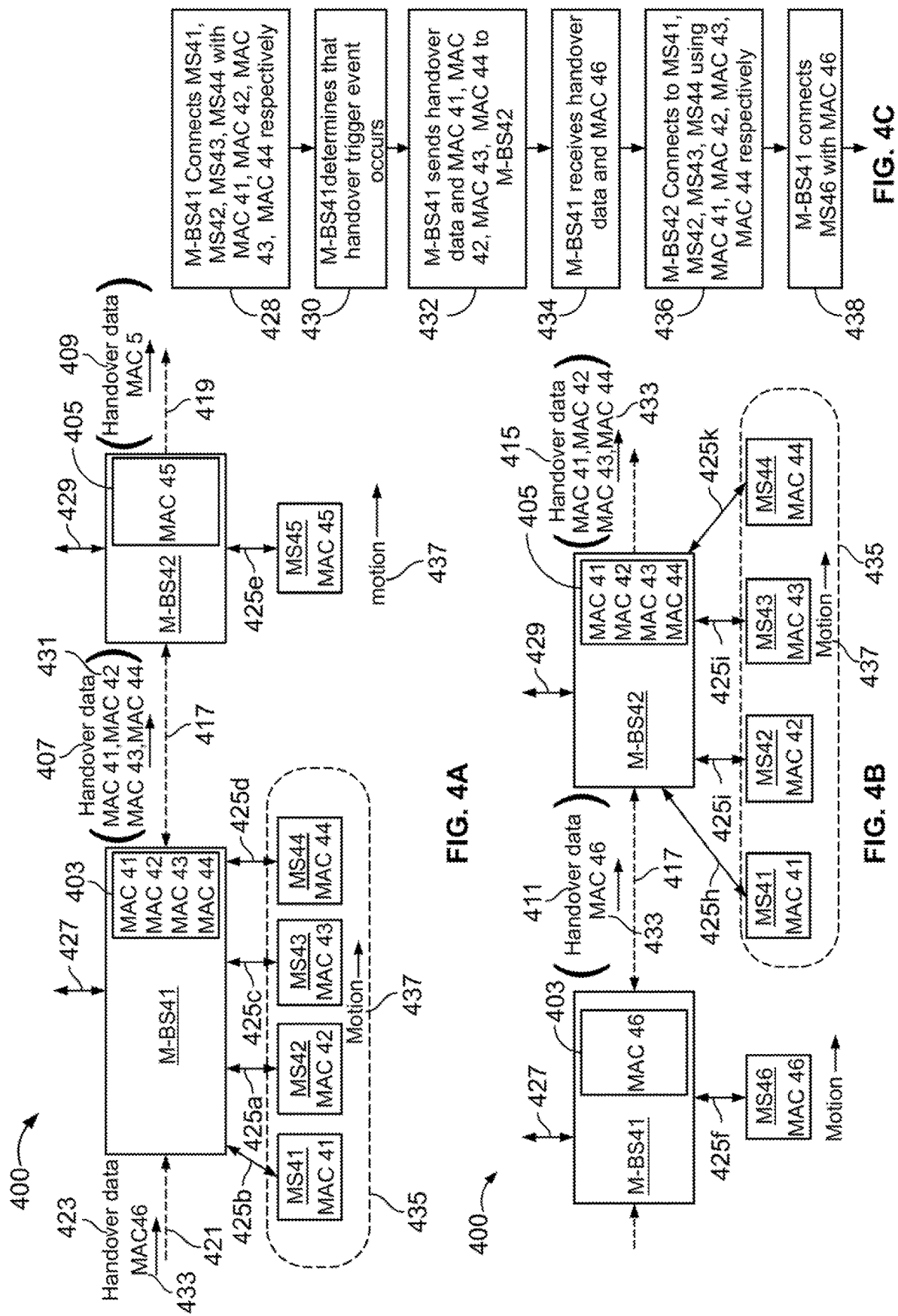

HANDOVER IN 5G MICROCELLULAR

BACKGROUND

The recent Federal Communications Commission (FCC) directive to allocate high frequency bands (20 GHz to 40 GHz+) for mobile devices communications in fifth generation (5G) wireless networks allows for the proliferation of micro-base stations in dense areas. These micro-base stations may be densely deployed, sometimes meters apart, in areas having large amounts of wireless traffic. For example, 5G networks may be deployed by configuring one or more micro-base stations in high wireless traffic areas, such as near major city intersections, subway stations, or other crowed public areas.

SUMMARY

In an implementation, a first base station of a network includes a processor and a memory in communication with the processor. The memory includes executable instructions that, when executed by the processor, cause the processor to control the first base station to perform functions of receiving, from a controller of the network, a first access ID list including a plurality of first access IDs, the first access ID list being one of a plurality of access ID lists generated by the controller of the network and assigned only to the first base station; associating one of the first access IDs to a first mobile device accessing the network via the first base station; determining that a handover trigger has occurred with respect to a first communication with the first mobile device associated with the first access ID; and performing a handover of the first communication with the first mobile device to a second base station of the network, wherein performing the handover includes sending, to the second base station, a list including the first access ID associated with the first mobile device.

In another implementation, a method of operating a first base station of a network includes receiving, from a controller of the network, a first access ID list including a plurality of first access IDs, the first access ID list being one of a plurality of access ID lists generated by the controller of the network and assigned only to the first base station; associating one of the first access IDs to a first mobile device accessing the network via the first base station; determining that a handover trigger has occurred with respect to a first communication with the first mobile device associated with the first access ID; and performing a handover of the first communication with the first mobile device to a second base station of the network, wherein performing the handover includes sending, to the second base station, a list including the first access ID associated with the first mobile device.

In another implementation, a first base station of a network includes means for receiving, from a controller of the network, a first access ID list including a plurality of first access IDs, the first access ID list being one of a plurality of access ID lists generated by the controller of the network and assigned only to the first base station; means for associating one of the first access IDs to a first mobile device accessing the network via the first base station; means for determining that a handover trigger has occurred with respect to a communication with the first mobile device associated with the first access ID; and means for performing a handover of the communication with the first mobile device to a second base station of the network, wherein performing the handover includes sending, to the second base station, a list including the stored access ID associated with the first mobile device.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 4A and 4B are diagrams illustrating example operation of devices used in handover of wireless communications in a traffic movement scenario;

FIG. 4C is a flow diagram showing example operations performed by devices during handover of wireless communications in a traffic movement scenario;

DETAILED DESCRIPTION

Figure 1:
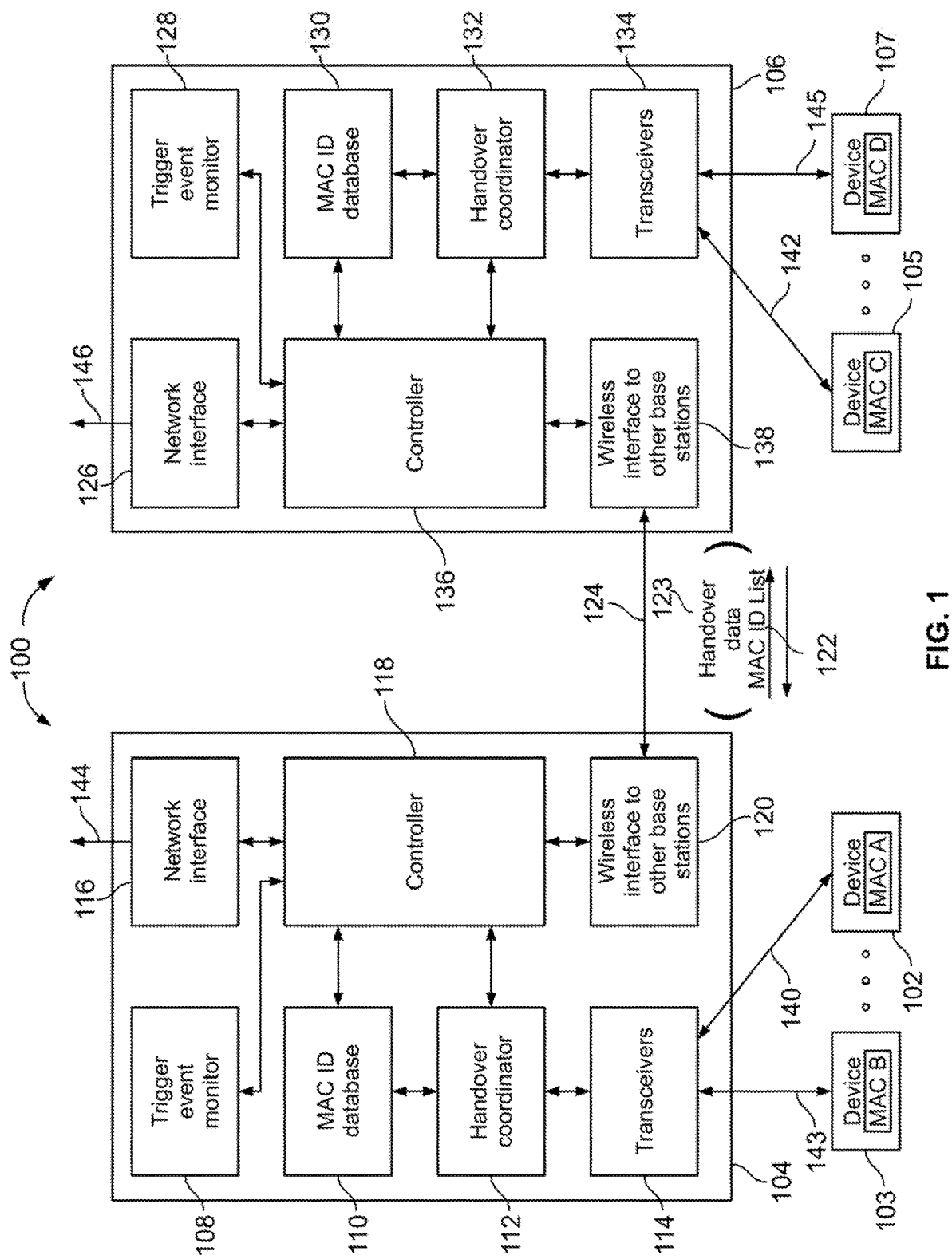
FIG. 1 is a diagram illustrating example devices operating according to embodiments of the disclosure.

The system, method and apparatus will now be described by use of example embodiments. The example embodiments are presented in this disclosure for illustrative purposes, and not intended to be restrictive or limiting on the scope of the disclosure or the claims presented herein.

The technologies and techniques that are described herein provide embodiments of systems, methods and apparatus for handover of wireless communication with mobile devices from one base station to another base station of a network, where the handover may be performed transparently to the mobile devices. As used in the disclosure and claims, the term handover means transferring, switching, changing, offloading, or moving communications that are between a first base station and a mobile device so that the communications are transferred, switched, changed, offloaded, or moved to be between a second base station and the mobile device. The embodiments provide advantages in situations in which traffic conditions on a base station, or the capability of a base station for supporting wireless traffic, may change rapidly. Mobile devices need not be modified. The embodiments provide a quick and efficient way for a base station to handover downlink and/or uplink communications on a wireless interface with one or more mobile devices to another base station, where each of the plurality of mobile devices is associated with an access ID stored in the base station. Upon determining that a trigger has occurred, the base station may handover communications between the one or more mobile devices to the other base station by sending a list of the access IDs of each of the one or more mobile devices to the other base station. The other base station may then takeover wireless communications with the selected one or more mobile device in place of the base station by using the access IDs. In one implementation, the access ID may be a MAC ID that is uniquely assigned to each mobile device as the mobile devices access a network of base stations.

In one example of an implementation of handover of wireless communications associated with a mobile device assigned an access ID from a first micro-base station to a second micro-base station, each of the first and second micro-base stations may be configured with functions for performing the handover. In this implementation, the first and second micro-base stations may be configured to initiate and coordinate the handover on their own without the mobile device or other network devices being involved. The first and second micro-base stations may be configured to receive communications from the mobile device using the same access ID at the same time during the handover. The first and second micro-base stations may then coordinate the communications so the mobile device is seamlessly handed over. In another implementation, the first and second micro-base stations may perform a hard handover by coordinating a time when the first base station terminates communications with the mobile device and the second base station begins communications with the mobile device. For uplink communications of the mobile device, the handover is seamless. For downlink communications, the first and/or second micro-base stations may be configured to update the relevant Ethernet switch with the new micro-base station network topology after handover. Any two micro-base stations may be configured as the first and second micro-base stations to participate in handover of communications independent of the mobile device. No code needs to be installed at the mobile device to facilitate the handover capability. A micro-base station/network manager may configure the handover capability on their micro-base stations and utilize it as needed. Use of the disclosed embodiments provides technical advantages in that third party session control services are not needed for session handover. The embodiments also provide session handover that can conveniently be controlled locally at the micro-base station level without requiring complicated modifications to the network. Micro-base stations configured according to the embodiments may be added to a network or removed from the network as network traffic conditions change.

Additionally, one of the micro-base stations could be designated as a preferred micro-base station for certain types of wireless communications sessions (video calls, media streaming, etc.) with a mobile device. An appropriate communications session on the first micro-base station could then be automatically handed over to a preferred second micro-base station, if the mobile device was in a suitable location near the second micro-base station.

The term micro-base station as used in this specification means a low power base station that covers an area such as a mall, a hotel, a transportation hub, or other similar public/private areas. For example, while a conventional cellular base station may cover an area of up to 22 kilometers, a micro-base station may use power control to limit the radius of its coverage area. In one application, a micro-base station may provide coverage in an area of 2 kilometers or less (microcell). A Micro-base station also includes a base station that provides coverage of an area on the order of 200 meters or less (picocell), or of an area of 10 meters or less (femtocell). Micro-base stations may be used to add network capacity in areas with very dense phone usage, such as train stations and are often deployed temporarily during sporting events and other occasions in which extra capacity is known to be needed at a specific location in advance. Use of micro-base stations with power control implemented in wireless networks makes it easier to prevent interference from nearby cells using the same frequencies. By subdividing cells, and creating more cells to help serve high density areas, a wireless network operator can optimize the use of spectrum and increase capacity. While implementations of the embodiments are described as using micro-base stations, the embodiments may be implemented in networks using any type of base station, or combination of types of base stations, when the disclosed techniques may provide an advantage.

One example scenario for use of the embodiments is where traffic conditions on micro-base stations in areas may change rapidly as pedestrians or vehicles carrying mobile devices move in and out of the micro-base station coverage areas. For example, the embodiments have use for handover of wireless communications to or from these types of micro-base stations by allowing wireless communications with any number of mobile devices, including groups of mobile devices, to be handed over as traffic conditions change. The handover may be triggered by traffic patterns or movement patterns of mobile devices communicating with the micro-base stations. The handover may be performed by sending access IDs associated with the mobile devices of the wireless communications that the micro-base station needs to handover to any number of other base stations. The sent access IDs may be received by other micro-base stations and used to take over the communications for the mobile device identified by the access IDs. In one example, the handover from a micro-base station may be performed according to timing based on knowledge of how mobile devices move into and out of the coverage area of the micro-base station In an implementation, the micro-base station may provide coverage near an entrance/exit gate within an airport, train station or other area through which a large number of mobile device users walk very quickly. In this scenario the handover timing and sending of access IDs may be based on knowledge of how mobile device users move through the coverage area of the micro-base station. The knowledge of how users move (such as how vehicles move) may include knowledge of time of day movement patterns. Based on the handover timing, any number of mobile devices, including groups of mobile devices, may be handed over by the micro-base station to other micro-base stations as desired. In another implementation, the micro-base station may provide coverage near a road, highway, or railway/subway. In this scenario the handover timing and sending of access IDs may be based on knowledge of how vehicles in which mobile devices are situated move through the coverage area of the micro-base station. The knowledge of how the vehicles move may include knowledge of time of day movement patterns. Based on the handover timing, any number of mobile devices, including groups of mobile devices, may be handed over by the micro-base station to other micro-base stations as the vehicles move.

Another implementation provides advantages where the capability of a micro-base station for supporting wireless traffic may change rapidly. For example, in a crowded area with many mobile devices and a large number of micro-base stations, the mobile devices may move rapidly in and out of the coverage areas of the micro-base stations. The embodiments provide advantages for handover of wireless communications to or from a micro-base station by allowing wireless communications with any number of mobile devices, including groups of mobile devices, to be handed over as the capability of the micro-base station changes. The handover and sending of access IDs to other micro-base stations may be triggered by a reduction in, or loss of the capability of the micro-base station to handle wireless traffic because it is overloaded, because of a loss of power, or because of a failure of the micro-base station. This provides an advantage where the servicing of remote micro-base stations may be sporadic because of high servicing costs or difficulty in gaining access. For example, a micro-base station may reconfigure itself by handing over wireless traffic as necessary until servicing can be performed. As the situation changes, a handover may be performed to transfer wireless communications back to the micro-base station from another micro-base station.

In one example, the micro-base station may perform a handover of mobile communications by sending access IDs associated with the mobile devices of the wireless communications that the micro-base station needs to handover to predetermined other micro-base stations. In another example, a micro-base station may perform a handover of mobile communications by broadcasting access IDs associated with the mobile devices of the wireless communications that the micro-base station needs to handover. The broadcast access IDs may be received by other micro-base stations. One or more of the other micro-base stations may then send an acceptance to the micro-base station broadcasting the access IDS indicating that handover of one or more of the access IDs will be accepted by the particular micro-base station sending the acceptance. The broadcasting micro-base station may then handover the wireless communications to one or more of the other micro-base stations. The broadcasting and acceptance procedure allows the micro-base stations to allocate wireless communications in a distributed/balanced manner to one or more of the other micro-base stations that send the acceptance.

In a further implementation, a controller may be configured for controlling one or more micro-base stations in a network and handover wireless traffic between the micro-base stations. This implementation provides advantages where the capability of micro-base stations for supporting wireless traffic may change rapidly, for example in a crowded area with many mobile devices and a large number of micro-base stations. This implementation presents an efficient way to balance wireless communications traffic among micro-base stations in a network where the handover is transparent and seamless for the mobile devices. The use of a controller provides a higher level view of network traffic or the conditions of multiple micro-base stations that may be compared with individual conditions at each of a plurality of other micro-base stations for efficient handover of wireless traffic, as compared to implementations configured within a micro-base station. The use of a controller also provides advantages in that various network traffic conditions such as backhaul load conditions or air interface load conditions on each of the plurality of base station may be taken into account when handing over wireless traffic. Other micro-base station conditions, such as available power conditions of a battery or solar powered micro-base station, may be also taken into account. The micro-base station condition may also include an operational capability, for example whether or not a micro-base station is in complete failure or is partially failed but capable of operating at a percentage of its normal capacity.

The controller may generate a plurality of access IDs and assign one or more of the plurality of access IDs to each of the plurality of micro-base stations. Each of the plurality of micro-base stations then uses their assigned access IDs to initiate wireless communications with mobile devices that each become associated with the assigned access ID. The controller may then monitor at least one condition in the system that is associated with the capacity of each micro-base station of the network to support wireless communications. Based on the monitoring of the at least one condition, the controller may determine that handover of wireless traffic between one or more of the plurality of micro-base stations should be performed. Based on the monitoring and the knowledge of which access IDs are assigned to each micro-base station, the controller may assign one or more of the plurality of access IDs to different micro-base stations. The controller may then send a reassignment/instruction message including the reassigned access IDs to the one or more micro-base stations between which traffic handover is to occur. The receipt of the reassignment/instruction message at the one or more micro-base stations then causes the wireless traffic of the mobile devices associated with the reassigned access IDs to be handed over to different micro-base stations according to the access ID reassignment.

FIG. 1 is a diagram illustrating example devices operating according to embodiments of the disclosure. Wireless network 100 includes micro-base stations 104 and 106. Wireless network 100 may also include any number of other micro-base stations that are not shown. Devices 102, 103, 105, and 107 are shown operating within the coverage area of micro-base stations 104 and 106. FIG. 1 shows devices 102 and 103 in a communications session with micro-base station 104 on wireless links 140 and 143, respectively. FIG. 1 also shows devices 105 and 107 in a communications session with micro-base station 106 on wireless links 142 and 145, respectively. Network 100 may be a network of micro-base stations comprising a private business network, a network implemented for commercial/retail applications, a public network, or any other type of wireless network. Also, any number of other devices, in addition to devices 102, 103, 105, and 107, may operate in network 100.

Micro-base station 104 includes trigger event monitor 108, MAC ID database 110, handover coordinator 112, transceivers 114, network interface 116, controller 118, and wireless interface to other micro-base stations 120. Micro-base station 106 includes trigger event monitor 128, MAC ID database 130, handover coordinator 132, transceivers 134, network interface 126, controller 136, and wireless interface to other micro-base stations 138. Micro-base station 104 and micro-base station 106 may communicate with each other over link 124. Link 124 may be, for example, a Wi-Fi wireless link or a hardwired link. Link 124 may be used to communicate MAC ID list 122 and handover data 123 between micro-base stations 104 and 106 according to the implementations of the disclosure.

In an implementation of network 100, micro-base station 104 may setup a wireless communications session through transceiver 114 with each of device 102 and device 103, respectively, by assigning MAC IDs that become associated with each device and that identify the wireless session. For example, devices 102 and 103 may be assigned MAC A and MAC B, respectively. Controller 118 may assign the MAC IDs from a list of MAC IDs stored in MAC ID database 110. In FIG. 1, there may be a set list of MAC IDS for each micro-base station of network 100 to use. The MAC ID lists may be configured in each micro-base station so that only one micro-base station at a time may use a particular MAC ID within network 100. The implementation of FIG. 1 may be configured so that the MAC IDs stored in MAC ID database 110 may only include MAC IDs that are currently available for micro-base station 104 to assign to mobile devices with which it is communicating, and the MAC IDs stored in MAC ID database 130 may only include MAC IDs that are currently available for micro-base station 106 to assign to mobile devices with which it is initiating communications or with which it is communicating. Because of this configuration, a device accessing network 100 will be assigned a MAC ID that is unique as compared to other devices in network 100.

Once the wireless communication sessions are setup with mobile devices 102 and 103 using MAC A and MAC B, respectively, mobile devices 102 and 103 may communicate with remote devices through the network interface 144 of micro-base station 104 that provides backhaul connections to other networks/remote devices. As communications are ongoing, controller 118 may receive an indication from trigger event monitor 108 that a trigger event has occurred and determine that a handover trigger has occurred based on the indication. In response to the determination that the handover trigger has occurred, controller 110 may initiate handover of communications between one or more of mobile devices 102 and 103 to the micro-base station 104. To initiate the handover, micro-base station 104 may send handover data 123 and a MAC ID List 122 to micro-base station 106 using wireless interface 124. The MAC ID list 122 includes the MAC ID(s) associated with the mobile device and wireless communication session that micro-base station wants to handover. Micro-base station 106 receives the handover data 123 and MAC ID List 122 at wireless interface 138. Controller 136 of micro-base station 106 then stores the MAC ID List 122 in MAC ID database 130. Controller 136 also uses the handover data 123 to control handover coordinator 132 to coordinate the handover of wireless communications of the mobile device associated with the MAC ID included in the MAC ID List 122 sent from micro-base station 104 to micro-base station 106. The handover data 123 may include control information needed to coordinate the handover that includes timing information for data transmissions from/to each mobile device being handed over during handover, information on any encryption used by controller 118 of micro-base station 104 in the session, and any data stored in micro-base station 104 that is needed by controller 130 of micro-base station 106 to take handover of the session without undue interruption of the data communications taking place in the session. For example, the handover control information may include information about parameters for the wireless protocol used on the link with the device to be handed over and/or encryption information.

As part of the handover, micro-base station 106 may return a signal to micro-base station 104 indicating that it has accepted the handover. During the handover, controller 118 of micro-base station 104 may remove the MAC IDs that were included in the MAC ID List 122 from MAC 1D database 110. Handovers done in the opposite direction from micro-base station 106 to micro-base station 104 may be performed in a reciprocal manner. This prevents micro-base station 104 from assigning the removed MAC ID to another mobile device.

During the handover, micro-base station 106 and micro-base station 104 may coordinate the handover. The coordination may include sending and receiving data to/from the mobile device(s) being handed over according to the timing information sent in the handover control signals. For example, controller 130 of micro-base station 106 may initiate the sending/receiving of data to/from the mobile device(s) being handed over using its associated MAC ID according to the timing information in the handover data 123. Also, controller 118 of micro-base station 104 may terminate the sending/receiving of data to/from the mobile device(s) being handed over using the MAC ID(s) according to the timing information. The timing may be configured so that micro-base station 104 terminates the sending/receiving of communications immediately before micro-base station 106 begins to send/receive data. The timing may be also configured so that micro-base station 104 terminates the sending/receiving of data at a time that allows a soft handover of the sending/receiving of data to/from the mobile device(s) between micro-base station 104 and micro-base station 106. Controller 130 of micro-base station 106 also may begin to use information sent by micro-base station 104 related to any encryption in the session, session protocol configurations, session application parameters, etc., that is needed to take handover of the session. Once the MAC IDs sent from micro-base station 104 are received at micro-base station 106, the uplink communications from the handed over device(s) are now received at micro-base station 106. Micro-base station 106 may then backhaul the packets through an Ethernet or optical switch. Handover on the uplink (mobile to the network) is seamless For the downlink, an Ethernet switch of network 100 may be updated with the new micro-base station network MAC ID topology by micro-base station 104 and/or micro-base station 106, so the MAC ID information is fully available to the network nodes/switches/controllers sitting behind the micro-base station 104 and micro-base station 106 when packets are received at the network for the handed over device(s).

Micro-base station 106 continues in place of micro-base station 104 in the session with the mobile device(s) that were handed over by receiving and sending communications associated with the MAC IDs transferred in MAC ID list 122. The mobile device(s) that were handed over may be unaware that the data communications are now with micro-base station 106 instead of micro-base station 104.

In an example implementation, the wireless links 140, 143, 142, and 145 may include uplink and downlink wireless channels that are configured according to a $5^{th}$ Generation (5G) Cellular interface standard. In other implementations the wireless links may be configured according to other wireless interface standards such as 3GPP Wide Band Code Division Multiple Access (WCDMA), 3GPP Long Term Evolution (LTE), Wi-Fi, or another wireless interface standard.

Devices 102, 103, 105, and 106 may be any type of mobile device such as a smart phone or laptop computer. Each of the devices 102, 103, 105, and 106 may also be alternatively implemented as any other type of device that may be configured with functionality supporting the embodiments disclosed herein. These other types of devices may include, for example, desktop PCs, gaming devices, media devices, smart televisions, home theater systems, smart automobile systems, smart house systems, multimedia cable/television boxes, smart phone accessory devices, tablet devices, tablet accessory devices, personal digital assistants (PDAs), portable media players, smart watches, smart sensors, or industrial control systems.

Figure 2A:
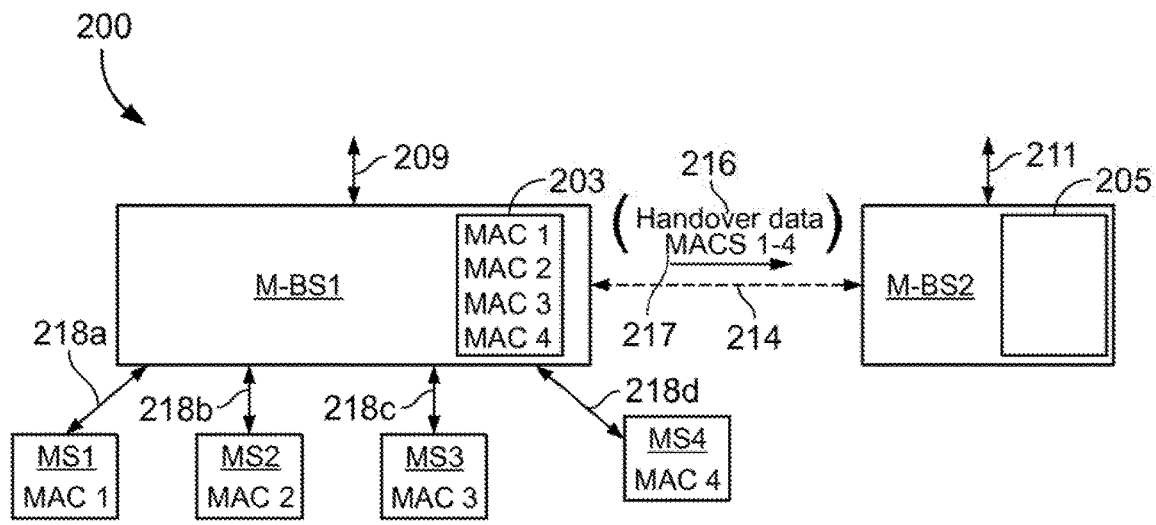
FIGS. 2A and 2B are diagrams illustrating an example of mobile device handover for wireless communications.
Figure 2B:
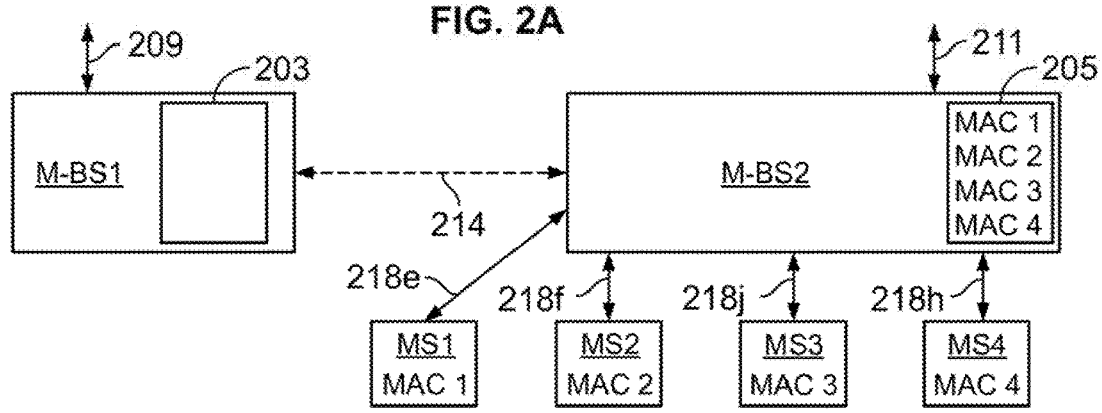
Figure 2C:
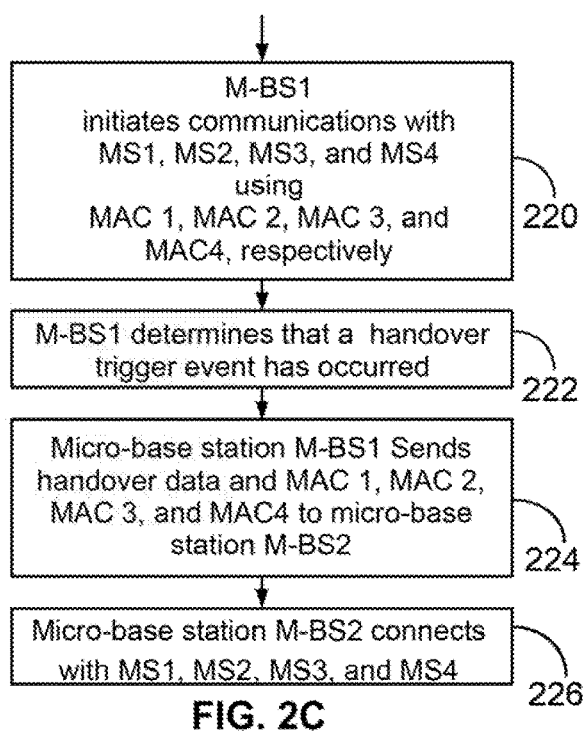
FIG. 2C is a flow diagram showing example operations performed by devices during handover of wireless communications.

FIGS. 2A and 2B are diagrams illustrating an example implementation of the network of FIG. 1. FIGS. 2A and 2B shows micro-base stations M-BS1 and M-BS2, and mobile devices MS1, MS2, MS3, and MS4, before and after handover, respectively. FIG. 2C is a flow diagram showing example operations performed by devices during handover of wireless communications. FIGS. 2A and 2B may be described in conjunction with the process shown in FIG. 2C. FIGS. 2A, 2B, and 2C illustrate an example of handover of a group of one or more mobile devices between micro-base stations M-BS1 and M-BS2.

The process begins at 220 where micro-base station M-BS1 initiates a wireless communications session with each of MS1, MS2, MS3, and MS4, using MAC 1, MAC 2, MAC 3, and MAC 4, to set up wireless links 218a, 218b, 218c, and 218d, respectively, as shown in FIG. 2A. At this point in time, MAC 1, MAC 2, MAC 3, and MAC 4 may be contained in MAC ID database 203 as MAC IDs that are not currently assigned to any mobile devices and that are therefore flee to be assigned to mobile devices initiating communications with network 200 at micro-base station M-BS1. For example, micro-base station M-BS1 may assign and send MAC 1 to MS1 when MS1 accesses network 200 through micro-base station M-BS1. Micro-base station M-BS1 may determine that MAC 1 may be assigned to MS1 by accessing MAC ID database 203 which contains the MAC IDs currently assigned to micro-base station M-BS1. The wireless sessions of MS2, MS3, and MS4 may be setup similarly. MS1, MS2, MS3, and MS4 are then associated with, respectively, MAC 1, MAC 2, MAC 3, and MAC 4. MAC 1, MAC 2, MAC 3, and MAC 4 may be a subset of a group of predefined MAC IDs that is used by micro-base stations in network 200, where the subset is currently only usable for initiating communications at micro-base station M-BS1. Use of unique subsets of MAC IDs, at each micro-base station M-BS1 and M-BS2, from the group of predefined network MAC IDs ensures that MAC IDs are not duplicated among different mobile devices accessing different micro-base stations in the network. Alternately, MAC 1, MAC 2, MAC 3, and MAC 4 may be MAC IDs that are generated in micro-base station M-BS1 randomly, or according to a predetermined algorithm, to avoid use of the same MAC ID in multiple micro-base stations. The use of random generation or use of a predetermined algorithm to generate the MAC IDs may be used when the micro-base stations are not able to coordinate MAC IDs assignments between one another for initial network communications with mobile devices. In this case, the random generation or use of a predetermined algorithm to generate MAC IDs may be configured to maximize the probability that MAC IDs are not duplicated in the network. When the wireless communications sessions have been set up, the mobile device connections and MAC ID assignments in network 200 are configured as shown in FIG. 2A.

At 222, micro-base station M-BS1 determines that a handover trigger event has occurred. The handover trigger event may be any event that causes the need to handover wireless traffic with MS1, MS2, MS3, and MS4 as a group to micro-base station M-BS2. The detection of the handover trigger may be based on knowledge of movement patterns of mobile devices, such as mobile devices MS1, MS2, MS3, and MS4, the relative loading on the interface of the micro-base stations M-BS1 and M-BS2, the effects on data traffic of MS1, MS2, MS3, and MS4, interference levels on the communications for each base station, the saturation of backhauling traffic load for each of the micro-base stations M-BS1 and M-BS2, packet error rates (PERs) on the air interfaces, and/or failover conditions on the micro-base stations M-BS1 and M-BS2.

Next, at 224, in response to the determination that a handover trigger event has occurred, micro-base station M-BS1 sends handover data 216 and MAC 1, MAC 2, MAC 3, and MAC 4 217 to micro-base station M-BS2 on interface 214. The handover data 216 may include four sets of handover data, handover data 1, handover data 2, handover data 3, and handover data 4, each associated with MAC 1, MAC 2, MAC 3, and MAC 4, respectively. Micro-base station M-BS2 stores MAC 1, MAC 2, MAC 3, and MAC 4 in MAC ID database 205.

At 226, micro-base station M-BS2 is connected with MS1, MS2, MS3, and MS4 as M-BS2 begins receiving/sending wireless communications to/from each of MS1, MS2, MS3, and MS4, using MAC 1, MAC 2, MAC 3, and MAC 4 on wireless links 218e, 218f, 218g, and 218h, respectively, using the handover data for timing and/or parameter setup associated with each MAC ID. Micro-base station M-BS1 and/or M-BS2 may also update the appropriate network Ethernet switch of the updated micro-base station topology so incoming packets for MS1, MS2, MS3, and MS4 will be routed to micro-base station M-BS2. Micro-base station M-BS1 may delete MAC 1, MAC 2, MAC 3, and MAC 4 from MAC ID database 203 after the handover is completed. The mobile device connections then are configured as shown in FIG. 2B.

Figure 3A:
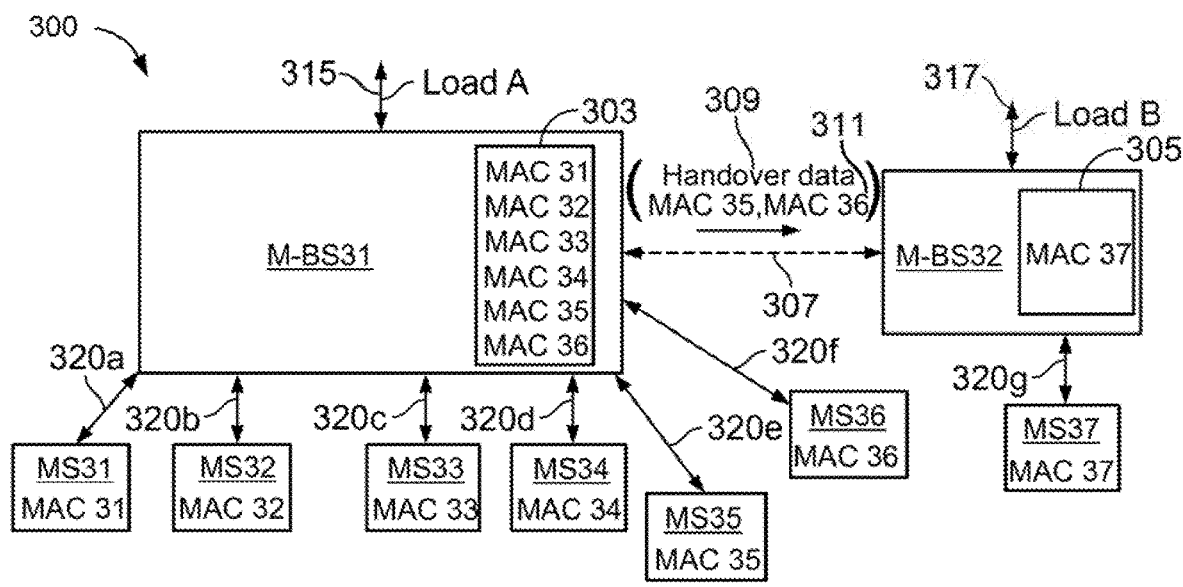
FIGS. 3A and 3B are diagrams illustrating another example of mobile device handover for wireless communications.
Figure 3B:
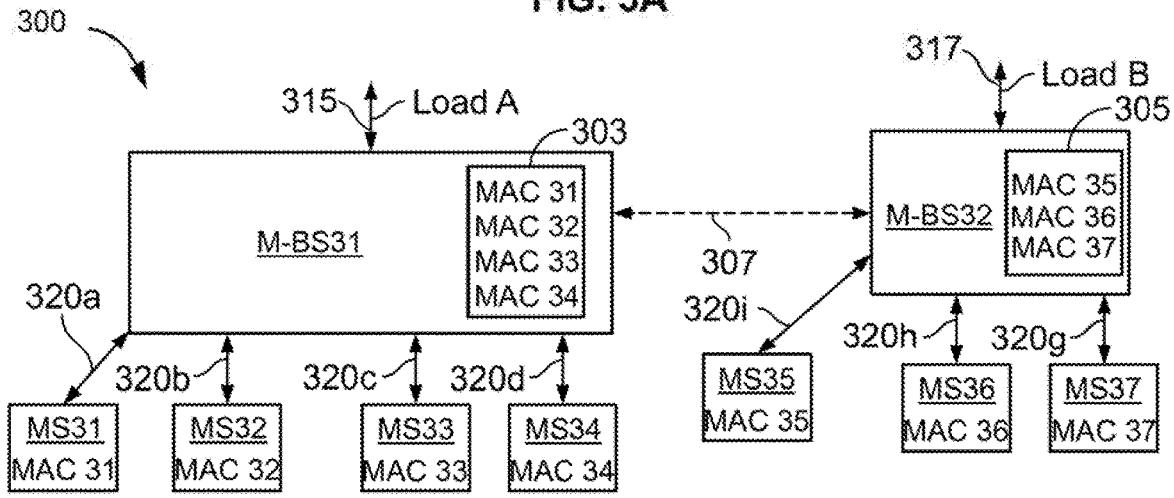
Figure 3C:
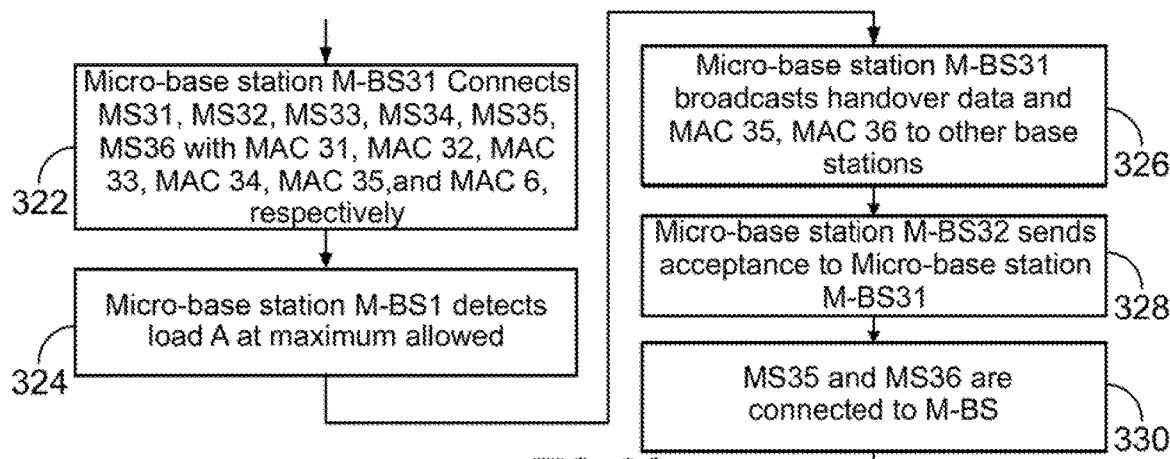
FIG. 3C is a flow diagram showing example operations performed by devices during handover of wireless communications.

FIGS. 3A and 3B are diagrams illustrating another example of mobile device handover for wireless communications according to the implementation of FIG. 1. FIGS. 3A and 3B show micro-base stations M-BS31 and M-BS32, and mobile devices MS1, MS2, MS3, MS4, MS5, MS6, and MS7 before and after, respectively, a handover. FIG. 3C is a flow diagram showing example operations performed by devices during handover of wireless communications. FIGS. 3A and 3B may be described in conjunction with the process shown in FIG. 3C. FIGS. 3A, 3B, and 3C illustrate an example of handover of a group of one or more mobile devices between micro-base stations M-BS31 and M-BS32 based on backhaul loading.

The process begins at 322 where micro-base station M-BS31 initiates a wireless communications session with each of MS31, MS32, MS33, MS34, MS35, and MS36 using MAC 31, MAC 32, MAC 33, MAC 34, MAC 35, and MAC 36 to set up wireless links 320a, 320b, 320c, 320d, 320e, and 320f, respectively. At this point in time, MAC 31, MAC 32, MAC 33, MAC 34, MAC 35, and MAC 36 may be contained in MAC ID database 303 as MAC IDs that are not currently assigned to any mobile devices and that are therefore free to be assigned to mobile devices initiating communications with network 300 at micro-base station M-BS31. The setup of the wireless links may be done over a time period as each of the mobile devices enter the coverage area of micro-base station M-BS31. For example, micro-base station M-BS31 may assign and send MAC 31 to MS31 when MS31 accesses network 300 through micro-base station M-BS31. Micro-base station M-BS31 may determine that MAC 31 may be assigned to MS31 by accessing MAC ID database 303 which contains the MAC IDs currently assigned to micro-base station M-BS31 for use in setting up communications with mobile devices. Mobile devices MS32, MS33, MS34, MS35, and MS36 may be connected to micro-base station M-BS31 similarly. The wireless sessions of MS31, MS32, MS33, MS34, MS35, and MS36 are then associated with, respectively, MAC 31, MAC 32, MAC 33, MAC 34, MAC 35, and MAC 36. MAC 31, MAC 32, MAC 33, MAC 34, MAC 35, and MAC 36 may be a subset of a group of predefined MAC IDs that are used by micro-base stations in network 300, where the subset is currently only usable in micro-base station M-BS1. Alternately, MAC 31, MAC 32, MAC 33, MAC 34, MAC 35, and MAC 36 may be MAC IDs that are generated in micro-base station M-BS31 randomly or according to a predetermined algorithm to avoid use of the same MAC ID in multiple micro-base stations. When the wireless communications sessions have been set up, the mobile device connections in network 300 are configured as shown in FIG. 3A. FIG. 3A also shows micro-base station M-BS32 connected in a wireless session with MS37 which is associated with MAC 37 stored in MAC ID data base 305.

At 324, micro-base station M-BS31 determines that load A on interface 315 is at a maximum level. The determination that load A on interface 315 is at a maximum level may be considered a handover trigger event that causes handover of wireless communications from micro-base station M-BS31 to one or more other micro-base stations. The determination at 324 may be performed based on determining that more than a predetermined amount of data traffic is being carried on interface 315, in either direction separately, or in both directions, to or from micro-base station M-BS31. The maximum load level may be set at an amount that is determined to negatively affect the quality of the data services at mobile devices connected to micro-base station M-BS31. In other example implementations, the determination at 324 that causes a handover trigger event may be any determination related to the capacity of micro-base station M-BS31 to provide wireless communications to mobile devices. For example, the determination at 324 that causes a handover trigger event may be a determination that more than a maximum allowed number of mobile devices have connected to micro-base station M-BS31, a determination that a selected data speed of one or more mobile devices or an average data speed for all the mobile devices connected to micro-base station M-BS31 has fallen below a certain level, or a determination that a bit/packet error rate for one or more mobile devices or an average bit/packet error rate for all the mobile devices connected to micro-base station M-BS31 has risen above a certain level. In other example implementations, the determination at 324 that causes a handover trigger event may be, for example, a determination that available power to micro-base station M-BS31 has fallen below a certain level, such as detection of a low battery or a reduction in available solar power, or a determination that a partial or complete failure of hardware in micro-base station M-BS31 has occurred. The determination at 324 that causes a handover trigger event may also be receipt of an indication from another micro-base station, such as micro-base station M-BS32, that the other base station has available capacity to take handover of wireless communications from micro-base station M-BS31.

Next, at 326, in response to the detection of the handover trigger event, micro-base station M-BS31 broadcasts handover data 309, and MAC 35 and MAC 36 311 on wireless interface 307 to other micro-base stations, including micro-base station M-BS32. In the implementation of FIGS. 3A, 3B, and 3C, the handover data 309 may include two sets of handover data, handover data 9 and handover data 10, associated with MAC 35 and MAC 36, respectively. In other implementations, any number of mobile devices may be handed over to micro-base station M-BS32. The number of mobile devices selected to be handed over may be based on the determination made at 324. For example, if load A on interface 315 is determined to be only a small amount over, or right at, the maximum level, one or two mobile devices may be handed over. If load A on interface 315 is a larger amount over the maximum level, three or more mobile devices may be handed over to micro-base station M-BS32. In other implementations where a parameter such as average data speed, an individual bit error rate, or an average data bit error rate for mobile devices connected to micro-base station M-BS31, or an available micro-base station M-BS31 power, is used as the basis to trigger handover, the number of mobile devices handed over may also depend on the parameter or the level of the parameter monitored. The number of mobile devices handed over may also depend on the available capacity of micro-base station M-BS32 to support newly handed over mobile devices.

The broadcast handover data 309 and MAC 35 and MAC 36 311 may then be received by one or more other micro-base stations and/or micro-base station M-BS32. A micro-base station that receives the broadcast of micro-base station M-BS31, including micro-base station M-BS32, may determine if it has capacity or is able to accept handover of the wireless traffic from micro-base station M-BS31. A micro-base station accepting handover may send an acceptance to micro-base station M-BS31 if it is able take the handover. In the example of FIG. 3C, micro-base station M-BS32 replies with an acceptance at 328. Micro-base station M-BS32 also stores MAC 35 and MAC 36 in MAC ID database 305 along with MAC 37. In other example implementations, the response at 326 to the detection of the handover trigger event at 324 by micro-base station M-BS31 may be to send the handover data 309 and MAC; 35 and MAC 36 311 on wireless interfaces 307 directly to micro-base station M-BS32 without broadcasting any handover data or MACs and waiting for an acceptance. In this case, the handover data 309 and MAC 35 and MAC 36 311 sent on wireless interfaces 307 directly to micro-base station M-BS32 may function, for example, as an instruction that micro-base station M-BS32 is to accept the handover.

Next, at 330, MS35 and MS36 are connected to micro-base station M-BS32. Micro-base station M-BS32 begins sending/receiving communications with each of MS35 and MS36, using MAC 35 and MAC 36, on wireless links 320i and 320h, respectively, using the handover data 309 for timing and/or parameter setup associated with each MAC ID and communicating with micro-base station M-BS31 to coordinate the handover. Micro-base station M-BS31 may delete MAC 35 and MAC 36 from MAC ID database 303 after the handover is completed. The mobile device connections then are configured as shown in FIG. 3B. Micro-base station M-BS31 and/or M-BS32 may also update the appropriate network Ethernet switch of the updated micro-base station topology so incoming packets for MS35 and MS36 will be routed to micro-base station M-BS32.

FIGS. 4A and 4B are diagrams illustrating a further example of mobile device handover of wireless communications from one micro-base station to another micro-base station according to an implementation. FIGS. 4A and 4B show network 400 before and after handover, respectively, that includes micro-base stations M-BS41 and M-BS42, and mobile devices MS41, MS42, MS43, MS44, MS45, and MS46. FIG. 4C is a flow diagram showing example operations performed by devices during handover of wireless communications. FIGS. 4A and 4B may be described in conjunction with the process shown in FIG. 4C.

In an implementation, micro-base stations M-BS41 and M-BS42 may be located in a heavy mobile traffic area, for example near an entrance/exit gate within an airport, train station, subway or other area through which a large number of mobile device users walk or are moved according to similar movement patterns. In this scenario the handover timing and triggering of handover may be based on knowledge of how mobile device users move through the coverage area of the micro-base stations. The knowledge of how the mobile devices move may include knowledge of time of day movement patterns. For example, FIGS. 4A and 4B illustrate devices MS41, MS42, MS43, and MS44 moving as a group within broken lines 435 toward micro-base station M-BS42 with substantially the same motion 437. MS45 is also shown moving past micro-base station M-BS42 with substantially the same motion.

In other implementations, the handover timing and triggering of handover may be based on the relative loading of the micro-base stations M-BS41 and M-BS42, interference levels on the communications for each base station, the saturation of backhauling traffic load for each of the micro-base stations M-BS41 and M-BS42, packet error rates (PERs) on the air interfaces, and failure conditions of the micro-base stations M-BS41 and M-BS42.

Based on the handover timing and triggering, any number of mobile devices, including groups of mobile devices, may be handed over by the micro-base station M-BS41 to micro-base station M-BS42 as desired. The coverage areas of micro-base stations M-BS41 and M-BS42 may be configured to overlap in order to account for a certain level of inaccuracy in the knowledge of the movement patterns. In another implementation of FIG. 4, the micro-base stations M-BS41 and M-BS42 may provide coverage near a road, highway, or railway/subway in which users of mobile devices in vehicles such as trains or automobiles are traveling. In this scenario the handover timing and sending of access IDs may be based on knowledge of how vehicles in which mobile devices are situated move through the coverage area of the micro-base station. The knowledge of how the vehicles move may include knowledge of time of day movement patterns and speed of movement. Based on the handover timing, any number of mobile devices, including groups of mobile devices, may be handed over by micro-base station M-BS41 to micro-base station M-BS42 as the vehicles move.

The process begins at 428 where micro-base station M-BS41 initiates a wireless communications session with each of MS41, MS42, MS43, and MS44 using MAC 41, MAC 42, MAC 43, and MAC 44, to set up wireless links 425a, 425b, 425c, and 425d, respectively. At this point in time MAC 41, MAC 42, MAC 43, and MAC 44 may be MAC IDs stored in MAC ID database 403 that are available for micro-base station M-BS41 to assign to mobile devices accessing network 400. For example, micro-base station M-BS41 may assign and send MAC 41 to MS 41 when MS41 accesses network 200 through micro-base station M-BS41. Micro-base station M-BS41 may determine that MAC 41 may be assigned to MS41 by accessing MAC ID database 403 which contains the MAC IDs currently assigned to micro-base station M-BS41 for use with mobile devices. Micro-base station M-BS41 may do a similar assignment of a MAC ID for MS42, MS43, and MS44 as those mobile devices come into the coverage area of micro-base station M-BS41. This may be done as MS41, MS42, MS43, and MS44 move as group 435 into the coverage area of micro-base station M-BS41 along motion path 437. The wireless sessions of MS41, MS42, MS43, and MS44 are then associated with, respectively, MAC 41, MAC 42, MAC 43, and MAC 44. MAC 41, MAC 42. MAC 43, and MAC 44 may be a subset of a group of predefined MAC IDs that is used by micro-base stations in network 200, where the subset is currently only usable in micro-base station M-BS41 for setting up initial communications for a mobile device. Alternately, MAC 41, MAC 42, MAC 43, and MAC 44 may be MAC IDs that are generated in micro-base station M-BS41 randomly or according to a predetermined algorithm, to avoid use of the same MAC ID in multiple micro-base stations. Micro-base-station M-BS42 may also connect to MS45 on a similar connection using MAC 45 as MS45 moves into the coverage area of micro-base station M-BS42 along motion path 437. When the wireless communications sessions have been set up, the mobile device wireless communications in network 400 are configured as shown in FIG. 4A.

At 430, micro-base station M-BS41 determines that a handover trigger event has occurred. The handover trigger event may be any event that causes the need to handover the wireless traffic with MS41, MS42, MS43, and MS44 to micro-base station M-BS42. The detection of the handover trigger may be based on knowledge of movement patterns of mobile devices along motion path 437 and a predetermined timing based on the movement patterns. In other implementations, the handover trigger may be based on the relative loading of the micro-base stations M-BS41 and M-BS42, interference levels on the communications for each base station, the saturation of backhauling traffic load for each of the micro-base stations M-BS41 and M-BS42, packet error rates (PERs) on the air interfaces, and/or failover conditions on the micro-base stations M-BS41 and M-BS42.

Next, at 432 micro-base station M-BS41 sends handover data 407 and MAC 41, MAC 42, MAC 43, and MAC 44 431 to micro-base station M-BS42 on interface 417. The handover data 407 may include four sets of handover data: handover data 41, handover data 42, handover data 43, and handover data 44, each associated with, MAC 41, MAC 42, MAC 43, and MAC 44, respectively. Micro-base station M-BS42 receives and stores the handover data 407 and MAC 41, MAC 42, MAC 43, and MAC 44 431. At 434, micro-base station M-BS41 may also receive and store handover data 423 and MAC 46 433 on interface 421. Handover data 423 and MAC 46 433 may be associated with a mobile device MS46 that is to be handed over to micro-base station M-BS41 from a third micro-base station that is not shown in FIG. 4A.

At 436, MS41, MS42, MS43, and MS44 are connected to micro-base station M-BS42. Micro-base station M-BS42 begins sending/receiving communications with each of MS41, MS42, MS43, and MS44, using MAC 41, MAC 42, MAC 43, and MAC 44, on wireless links 425h, 425i, 425j, and 425k, respectively, using the handover data for timing and/or parameter setup associated with each MAC ID and communicating with micro-base station M-BS41 to coordinate the handover. Micro-base station M-BS41 may delete MAC 41, MAC 42, MAC 43, and MAC 44 from MAC ID database 403 after the handover is completed. During operation 436, micro-base station M-BS42 may also hand over wireless communications with MS45 to another micro-base station (not shown) to which micro-base station M-BS42 has sent handover data 409 and MAC 45 on wireless link 419. The mobile device connections for MS41, MS42, MS43, and MS44 then are configured as shown in FIG. 4B. Micro-base stations M-BS41 and/or M-BS42 may also update the appropriate network Ethernet switch of the updated micro-base station topology so incoming packets for MS41, MS42, MS43, and MS44 will be routed to micro-base station M-BS42.

At 438, micro-base station M-BS41 may also connect with MS46 using MAC 46 on wireless link 425f using the handover data for timing and/or parameter setup associated with MAC 46. Micro-base station M-BS41 may communicate with the micro-base station (not shown) handing over MS46 to coordinate the handover. The MAC ID database 403 of micro-base station M-BS41 may then contain MAC 46 and the wireless connection for MS46 may be configured as shown in FIG. 4B. Micro-base station M-BS41 may also update the appropriate network Ethernet switch of the updated micro-base station topology so incoming packets for MS46 will be routed to micro-base station M-BS41.

Figure 5A:
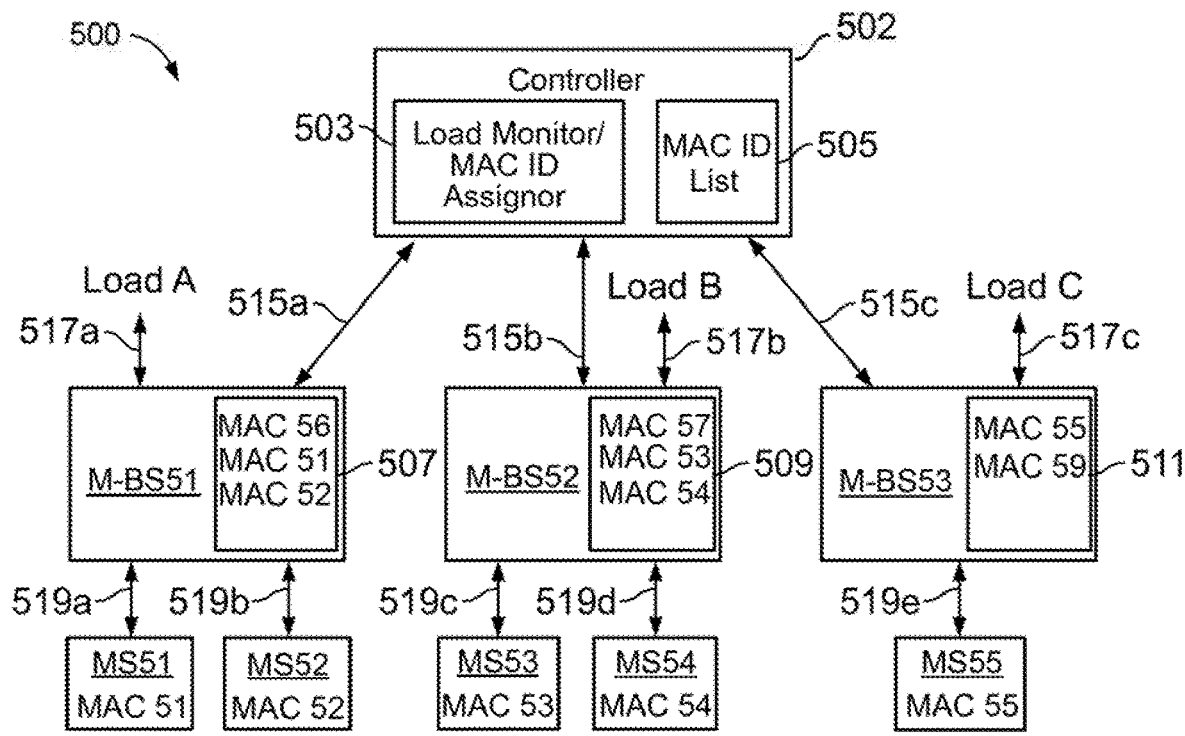
FIGS. 5A and 5B are diagrams illustrating example operation of a controller and devices used in handover of wireless communications.
Figure 5B:
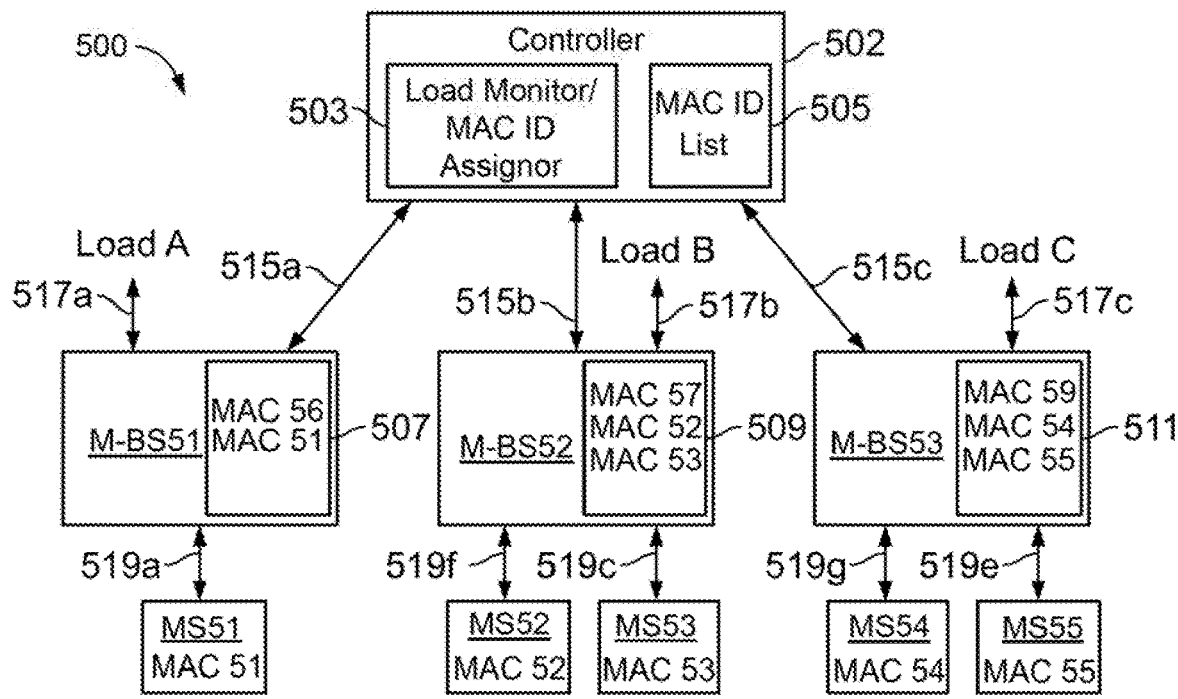
Figure 5C:
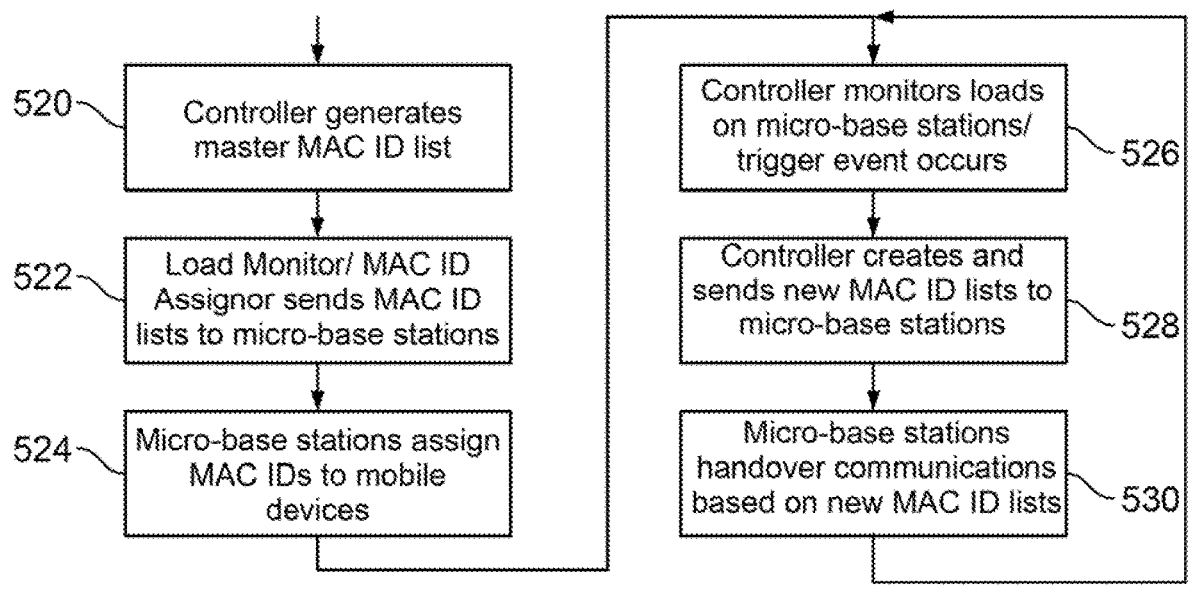
FIG. 5C is a flow diagram showing example operations performed by a controller and devices during handover of wireless communications.

FIGS. 5A and 5B are diagrams illustrating a further example of mobile device handover of wireless communications from one micro-base station to another micro-base station according to an implementation. FIGS. 5A and 5B show network 500 before and after handover, respectively, that includes micro-base stations M-BS51, M-BS52, and M-BS53, and mobile devices MS51, MS52, MS53, and MS55. FIGS. 5A and 5B also show controller 502. FIG. 5C is a flow diagram showing example operations performed by controller 502 and micro-base stations M-BS51, M-BS52, and M-BS53 during handover of wireless communications. FIGURES SA and SB may be described in conjunction with the process shown in FIG. 5C.

The process begins at 520 where controller 502 generates a master MAC ID list 505. The MAC ID list may comprise MAC IDs that are randomly generated or that are a selected set of MAC IDS used only by controller 502. At 522, load monitor/MAC ID assignor 503 sends MAC ID lists to micro-base stations comprising subsets of MAC IDS from the master MAC ID list to each of micro-base stations M-BS51, M-BS52, and M-BS53. The load monitor/MAC ID assignor 503 performs the assignments so each MAC ID is only assigned to one micro-base station. Each of micro-base stations M-BS51. M-BS52, and M-BS53 may store their assigned MAC IDs in MAC ID databases 507, 509, and 511, respectively. In one example, controller 502 may assign an equal number of MAC IDs to each micro-base station and send a list of the assigned MAC IDs to each micro-base station. In FIG. 5A, micro-base station M-BS51 has been assigned MAC 51, MAC 52, and MAC 56, micro-base station M-BS52 has been assigned MAC 57, MAC 53, and MAC 54, and micro-base station M-BS53 has been assigned MAC 55 and MAC 59. In another example, controller 502 may assign MAC IDs individually, upon request of each micro-base station M-BS51, M-BS52, or M-BS53, as mobile devices access the individual micro-base stations. The number of assigned MAC IDs for each base station may be larger than the number of MAC IDs shown for each micro-base station in FIG. 5A.

At 524, the micro-base stations M-BS51, M-BS52, and M-BS53 assign MAC IDS to mobile devices. This may be done as each mobile device accesses the network. For example, in FIGURE SA, MS51 and MS 52 have been assigned MAC 51 and MAC 52, respectively, from MAC ID database 507 of micro-base station M-BS51 as MS51 and MS 52 have accessed network 500 at micro-base station M-BS5 on links 519a and 519b. Similarly, MS53 and MS 54 have been assigned MAC 53 and MAC 54, respectively, from MAC ID database 509 of micro-base station M-BS52 as MS53 and MS 54 have accessed network 500 at micro-base station M-BS52 at links 519c and 519d, and MS55 has been assigned MAC 55 from MAC ID database 511 of micro-base station M-BS53 as MS55 has accessed network 500 at micro-base station M-BS53 on link 519e. Once assigned, each MAC ID may only be used in the network on the connection with the mobile device to which it was assigned.

Next, at 526, load monitor/MAC ID assignor 503 monitors load A, load B, and load C on back haul interfaces 517a, 517b, and 517c, respectively, of micro-base stations M-BS51, M-BS52, and M-BS53. At 526, while monitoring load A, load B, and load C, load monitor/MAC ID assignor 503 may determine a trigger event has occurred. The trigger event may be based on determining that more than a predetermined maximum load level of data traffic is being carried as load A, load B, or load C on, respectively, interface 517a, 517b, or 517c, in either direction separately, or in both directions, to or from micro-base station M-BS51, M-BS52, or M-BS53. The maximum load level may be set at an amount that is determined to negatively affect the quality of the data services at mobile devices connected to micro-base station M-BS51, M-BS52, or M-BS53. In other example implementations, the determination at 526 that causes detection of a handover trigger event may be any determination related to the capacity of micro-base station micro-base station M-BS51, M-BS52, or M-BS53 to provide wireless communications to mobile devices.

For example, the determination at 526 that detects an handover trigger event may be a determination that more than a maximum allowed number of mobile devices have connected to micro-base station M-BS51, M-BS52, or M-BS53, a determination that a selected data speed of one or more mobile devices, or an average data speed for all the mobile devices, connected to micro-base station M-BS51, M-BS52, or M-BS53 has fallen below a certain level, or a determination that a bit error rate for one or more mobile devices, or an average data bit error rate for all the mobile devices, connected to micro-base station M-BS51, M-BS52, or M-BS53 has risen above a certain level.

In other example implementations, the determination at 426 that causes an handover trigger event may be, for example, for example, a determination that available power to micro-base station M-BS51, M-BS52, or M-BS53 has fallen below a certain level, for example, such as detection of a low battery or a reduction in available solar power, or a determination that a partial or complete failure of hardware in micro-base station M-BS51, M-BS52, or M-BS53 has occurred. The determination at 526 that causes a handover trigger event may also be receipt of an indication from a micro-base station, such as micro-base station M-BS52, that the other base station has available capacity to take handover of wireless communications from the other micro-base stations M-BS51 and M-BS53 when those micro-base stations are heavily loaded.

At 528, controller 502 creates new MAC ID lists, based on the monitoring of load A, load B, and load C, and sends a new list to each of micro-base stations M-BS51, M-BS52, and M-BS53. The new MAC ID lists are used to reassign MAC IDs from one of micro-base stations M-BS51, M-BS52, and M-BS53 to another. The new MAC ID lists may be configured to create a desired traffic load for A, load B, and load C. For example, in FIGURE SB, a new MAC ID list may be sent to micro-base station M-BS51 to reconfigure MAC ID database 507 to include MAC 51 and MAC 56. MAC ID databases 509 and 511 of micro-base stations M-BS52 and M-BS53 may also be reconfigured as shown in FIGURE SB using the new MAC ID lists. As part of the each new MAC ID list, controller 502 may also send handover data including any previously assigned MAC IDs that are now to be handed over from the micro-base station receiving the new list. For example, the new MAC ID list sent to micro-base station M-BS51 may include handover data including an indication that MAC 52 is to be reassigned to micro-base station M-BS52, and the new MAC ID list sent to micro-base station M-BS52 may include handover data including an indication that MAC 54 is to reassigned to micro-base station M-BS53.

At 530, micro-base stations M-BS51, M-BS52, and M-BS53 handover wireless communications according to the new MAC ID lists. For example, micro-base station M-BS51 may handover communications with MS52 to micro-base station M-BS2 on link 519f, and micro-base station M-BS52 may handover communications with MS54 to micro-base station M-BS4 on link 519g. Micro-base stations M-BS52 and M-BS53 may also update the appropriate network Ethernet switch of the updated micro-base station topology so incoming packets for MS51 and MS54, will be routed to micro-base station M-BS52 and M-BS53, respectively.

Figure 6:
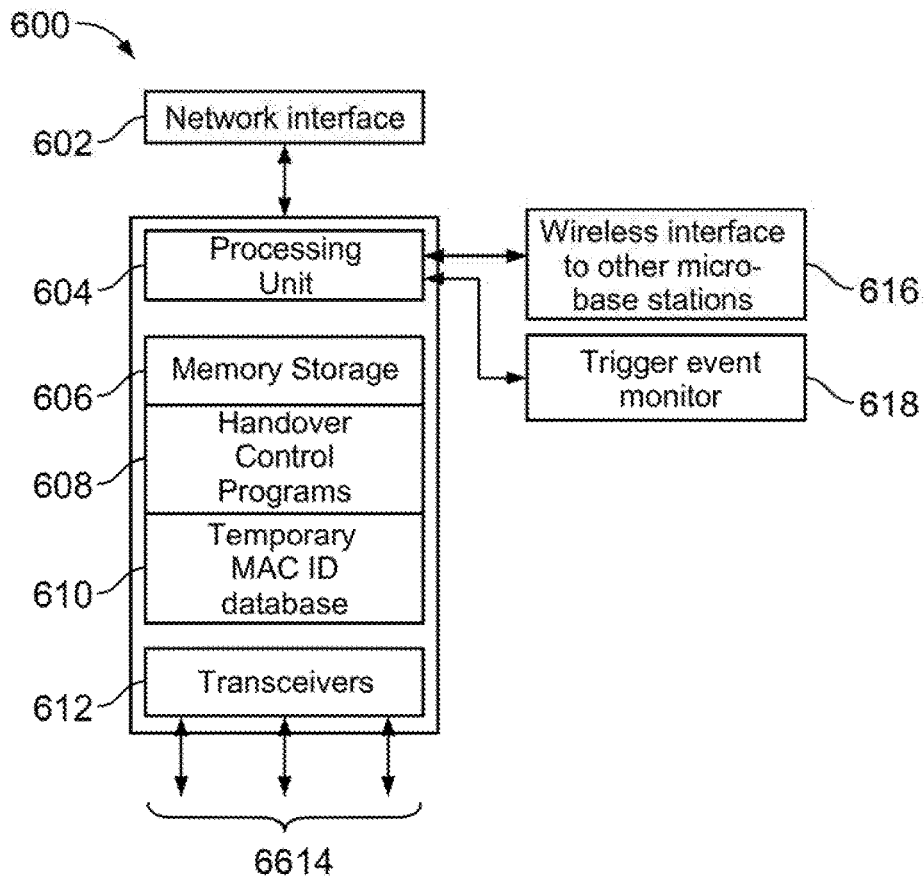
FIG. 6 is a simplified block diagram showing an example base station.

Referring now to FIG. 6, therein is a simplified block diagram of an example micro-base station 600 which may be implemented in a network to perform handover operations. Micro-base station 600 represents a possible implementation of any of the micro-base station of FIGS. 2-5. Micro-base station 600 includes processing unit 604, transceivers 612, and memory/storage 7606 that includes code and instructions for handover control programs 608 and code comprising temporary MAC ID database 610 which may include the identities of MAC IDs that are assigned to micro-base station micro-base station 600 connects to a backend network over interface 602. Micro-base station 600 also includes a wireless interface to other micro-base stations 161 and trigger event monitor 618. Processing unit 604 may comprise one or more processors, or other control circuitry or any combination of processors and control circuitry that provide overall control of micro-base station 600 according to the disclosed embodiments. Transceivers 612 provide the capability for to communicate with devices, such as device 102, 103, 105, and 107 of FIG. 1. Memory 606 may be implemented as any type of as any type of computer readable storage media, including non-volatile and volatile memory.

In the embodiments, execution of handover control programs 608 causes processing unit 604 to implement operations that cause micro-base station 600 to perform appropriate operations according to FIGS. 2C, 3C, and 4C to provide handover for mobile devices.

Figure 7:
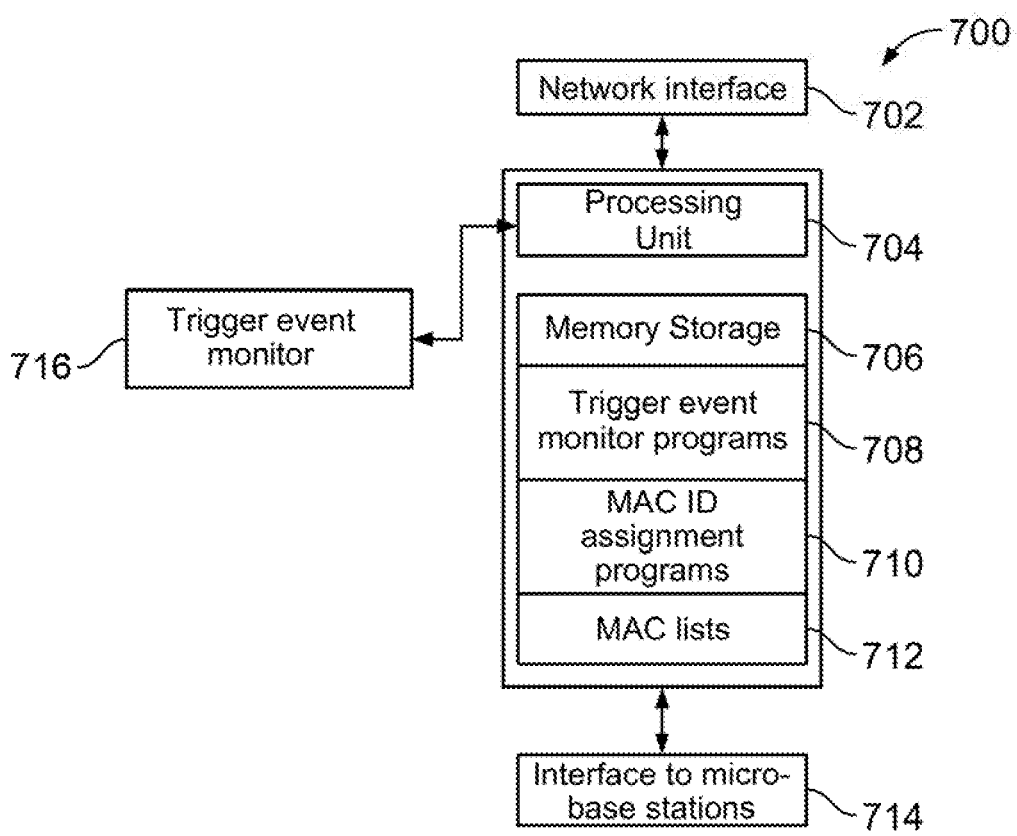
FIG. 7 is a simplified block diagram showing an example controller.

Referring now to FIG. 7, therein is a simplified block diagram showing an example controller 700 which may be implemented in a network to perform handover operations. Controller 700 represents a possible implementation of the controller 502 of FIG. 5. Controller 700 includes processing unit 704, network interfaces 702, interfaces to micro-base stations 714, trigger event monitor, and memory/storage 706 that includes code and instructions for trigger event monitor programs 708 and code comprising MAC ID assignment programs 710 which may include the identities of MAC IDs that are assigned by Controller 700 to micro-base stations. Controller 700 connects to a backend network over interface 702. Processing unit 704 may comprise one or more processors, or other control circuitry or any combination of processors and control circuitry that provide overall control of Controller 700 according to the disclosed embodiments. Interfaces to micro-base stations 714 provide the capability to communicate with micro-base stations, such as micro-base stations M-BS51, M-BS52, or M-BS53 of FIG. 5. Memory 706 may be implemented as any type of as any type of computer readable storage media, including non-volatile and volatile memory.

In the embodiments, execution of for trigger event monitor programs 708 and 7 MAC ID assignment programs 710 causes processing unit 704 to implement operations that cause controller 700 to perform appropriate operations according to FIG. 5C to provide handover for mobile devices.

The example embodiments disclosed herein may be described in the general context of processor-executable code or instructions stored on memory that may comprise one or more computer readable storage media (e.g., tangible non-transitory computer-readable storage media such as memory 608 or 708). As should be readily understood, the terms "computer-readable storage media" or "non-transitory computer-readable media" include the media for storing of data, code and program instructions, such as memory 608 or 706, and do not include portions of the media for storing transitory propagated or modulated data communication signals.

While the functionality disclosed herein has been described by illustrative example using descriptions of the various components and devices of embodiments by referring to functional blocks and processors or processing units, controllers, and memory including instructions and code, the functions and processes of the embodiments may be implemented and performed using any type of processor, circuit, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is mean to include all such implementations.

The disclosed embodiments included a first base station comprising one or more processors, and memory in communication with the one or more processors, the memory comprising code that, when executed, causes the one or more processors to control the first base station to initiate communications with each of one or more mobile devices, wherein each of the one or more of mobile devices is associated with an access ID of one or more access IDs stored in the first base station, determine that a handover trigger has occurred, and, in response to the determination that the handover trigger has occurred, handover communications with at least one mobile device of the one or more mobile devices to at least one second base station, each of the at least one mobile device associated with a selected access ID included in a list sent from the first base station to the at least one second base station, the list comprising at least a subset of the one or more access IDs. The code may be further executable to cause the one or more processors to control the first base station to send the list to the second base station in response to the determination that the handover trigger has occurred. The first base station may determine that a handover trigger has occurred by determining that a time period has expired. The handover trigger may be based on estimated movement patterns of the one or more mobile devices in an area of the first and second base stations. The estimated movement patterns of the one or more mobile devices may be at least based on one or more mobile devices being in one or more vehicles. The estimated movement patterns of the one or more mobile devices may be based at least on the one or more mobile devices being carried by pedestrians. The first base station may determine that the handover trigger has occurred by monitoring a power source of the first base station. The first base station may determine that the handover trigger has occurred by monitoring a traffic load on the first base station. The first base station may determine that the handover trigger has occurred by monitoring backhaul saturation at the first base station. The first base station may determine that the handover trigger has occurred by monitoring a channel quality parameter at the first base station. The at least one mobile device may comprises a first and a second mobile device and the at least one second base station may comprise a plurality of second base stations, and the first base station may handover communications with each of the first and second mobile device to separate ones of the plurality of second base stations. The first base station may identify each of the at least one devices to the at least one second base station by sending a broadcast including the access ID of each of the at least one mobile devices. The first base station may terminate communications with the one or more mobile in response to receiving an acceptance from the at least one second base station to the broadcast.

The disclosed embodiments also include a first base station comprising one or more processors, and memory in communication with the one or more processors, the memory comprising code that, when executed, causes the one or more processors to control the first base station to receive a first list of one or more access IDs from a second base station, initiate communications with each of one or more mobile devices using the one or more access IDs, wherein each of the one or more mobile devices is associated with an access ID of the one or more access IDs, determine that a handover trigger has occurred, and, in response to the determination that the handover trigger has occurred, handover communications with at least one mobile device of the one or more mobile devices to at least one third base station, each at least one mobile device associated with an access ID included in a second list sent from the first base station to the at least one third base station, the second list comprising at least a subset of the one or more access IDs.

The disclosed embodiments further included an apparatus for controlling a network including a first and second base station, the apparatus comprising one or more processors, and memory in communication with the processor, the memory comprising code that, when executed, causes the one or more processors to control the apparatus to generate a plurality of access IDs, assign each of the plurality of access IDs to one of the first or second base station, wherein each of the plurality of access IDS is for associating with one of a plurality of mobile devices communicating with the first or second base station, send a first and second assignment list to the first and second base station, respectively, to cause a selected access ID sent to the first base station to be associated with selected mobile device of the plurality of mobile devices, monitor at least one condition in the network, determine, based on the monitoring of the at least one condition, that a handover trigger has occurred, reassigning, in response to the determination that handover trigger has occurred, one or more of the plurality of access IDs, wherein the selected access ID associated with the selected mobile device of the plurality of mobile devices is reassigned from the first to the second base station, send a third and fourth assignment list to the first and second base station, respectively, to cause the selected mobile device of the plurality of mobile devices to be switched from communicating with the first base station to communicate with the second base station. The handover trigger may comprise a load condition of at least one of the first and second base station. The load condition may comprise a backhaul load condition of at least one of the first and second base station. The load condition may comprise an air interface load condition on at least one of the first and second base station. The handover trigger may comprise an available power condition on at least one of the first and second base station. The handover trigger may comprise an operational capability condition of at least one of the first and second base station.

Although the subject matter has been described in language specific to structural features and/or methodological acts, it is to be understood that the subject matter defined in the appended claims is not necessarily limited to the specific features or acts described above. Rather, the specific features and acts described above are disclosed as example embodiments, implementations, and forms of implementing the claims and these example configurations and arrangements may be changed significantly without departing from the scope of the present disclosure. Moreover, although the example embodiments have been illustrated with reference to particular elements and operations that facilitate the processes, these elements, and operations may be combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A first base station of a network, comprising:
   a processor; and
   a memory in communication with the processor, the memory comprising executable instructions that, when executed by the processor, cause the processor to control the first base station to perform functions of:
      receiving, from a controller of the network, a first access ID list comprising a plurality of first access IDs, the first access ID list being one of a plurality of access ID lists generated by the controller of the network and assigned only to the first base station;
      associating one of the first access IDs to a first mobile device accessing the network via the first base station;
      determining that a handover trigger has occurred with respect to a first communication with the first mobile device associated with the first access ID; and
      performing a handover of the first communication with the first mobile device to a second base station of the network, wherein performing the handover includes sending, to the second base station, a list including the first access ID associated with the first mobile device.

2. The first base station of claim 1, wherein, for determining that a handover trigger has occurred, the instructions, when executed by the processor, further cause the processor to control the first base station to perform a function of determining that a predetermined time period has expired.

3. The first base station of claim 1, wherein, for determining that a handover trigger has occurred, the instructions, when executed by the processor, further cause the processor to control the first base station to perform a function of determining an estimated movement pattern of the first mobile device.

4. The first base station of claim 3, wherein the estimated movement pattern of the first mobile device is determined based on a movement of the first mobile device in a vehicle.

5. The first base station of claim 3, wherein the estimated movement pattern of the first mobile device is determined based on a movement of the first mobile device carried by a pedestrian.

6. The first base station of claim 1, wherein, for determining that a handover trigger has occurred, the instructions, when executed by the processor, further cause the processor to control the first base station to perform a function of monitoring a power source of the first base station.

7. The first base station of claim 1, wherein, for determining that a handover trigger has occurred, the instructions, when executed by the processor, further cause the processor to control the first base station to perform a function of monitoring a traffic load on the first base station.

8. The first base station of claim 1, wherein, for determining that a handover trigger has occurred, the instructions, when executed by the processor, further cause the processor to control the first base station to perform a function of monitoring backhaul saturation at the first base station.

9. The first base station of claim 1, wherein, for determining that a handover trigger has occurred, the instructions, when executed by the processor, further cause the processor to control the first base station to perform a function of monitoring a channel quality parameter at the first base station.

10. The first base station of claim 1, wherein the instructions, when executed by the processor, further cause the processor to control the first base station to perform functions of:
    associating another one of the first access IDs to a second mobile device accessing the network via the first base station;
    determining that a handover trigger has occurred with respect to a second communication with the second mobile device; and
    performing a handover of the second communication to a third base station of the network, wherein performing the handover of the second communication includes sending, to the third base station, a list including the first access ID associated with the second mobile device.

11. The first base station of claim 1, wherein, for performing the handover of the first communication, the instructions, when executed by the processor, further cause the processor to control the first base station to perform a function of sending, to the second base station, a broadcast including the first access ID associated with the first mobile device.

12. The first base station of claim 11, wherein, the instructions, when executed by the processor, further cause the processor to control the first base station to perform functions of:
    receiving an acceptance of the broadcast from the second base station; and
    terminating the first communication with the first mobile device in response to the acceptance received from the second base station.

13. The first base station of claim 1, wherein each of the plurality of access ID lists comprises a list of MAC IDs.

14. A method of operating a first base station of a network, comprising:
    receiving, from a controller of the network, a first access ID list comprising a plurality of first access IDs, the first access ID list being one of a plurality of access ID lists generated by the controller of the network and assigned only to the first base station;
    associating one of the first access IDs to a first mobile device accessing the network via the first base station;
    determining that a handover trigger has occurred with respect to a first communication with the first mobile device associated with the first access ID; and
    performing a handover of the first communication with the first mobile device to a second base station of the network, wherein performing the handover includes sending, to the second base station, a list including the first access ID associated with the first mobile device.

15. The method of claim 14, wherein determining that a handover trigger has occurred comprises at least one of:
    determining that a predetermined time period has expired;
    determining an estimated movement pattern of the first mobile device;
    monitoring a power source of the first base station;
    monitoring a traffic load on the first base station;
    monitoring backhaul saturation at the first base station; and
    monitoring a channel quality parameter at the first base station.

16. The method of claim 15, wherein the estimated movement pattern of the first mobile device is determined based on one of:
    a movement of the first mobile device in a vehicle; and
    a movement of the first mobile device carried by a pedestrian.

17. The method of claim 14, further comprising:
    associating another one of the first access IDs to a second mobile device accessing the network via the first base station;
    determining that a handover trigger has occurred with respect to a second communication with the second mobile device; and
    performing a handover of the second communication to a third base station of the network, wherein performing the handover of the second communication includes sending, to the third base station, a list including the first access ID associated with the second mobile device.

18. The method of claim 14, wherein performing the handover of the first communication comprises sending, to the second base station, a broadcast including the first access ID associated with the first mobile device.

19. The method of claim 18, further comprising:
    receiving an acceptance of the broadcast from the second base station; and
    terminating the first communication with the first mobile device in response to the acceptance received from the second base station.

20. The method of claim 14, wherein each of the plurality of access ID lists comprises a list of MAC IDs.

21. A first base station of a network, comprising:
    means for receiving, from a controller of the network, a first access ID list comprising a plurality of first access IDs, the first access ID list being one of a plurality of access ID lists generated by the controller of the network and assigned only to the first base station;
    means for associating one of the first access IDs to a first mobile device accessing the network via the first base station;
    means for determining that a handover trigger has occurred with respect to a communication with the first mobile device associated with the first access ID; and means for performing a handover of the communication with the first mobile device to a second base station of the network, wherein performing the handover includes sending, to the second base station, a list including the stored access ID associated with the first mobile device.

22. The first base station of claim 21, wherein each of the plurality of access ID lists comprises a list of MAC IDs.

* * * * *